United States Patent [19]

Gillis

[11] Patent Number: 4,809,726
[45] Date of Patent: Mar. 7, 1989

[54] FOLDABLE POLYHEDRAL STRUCTURE

[76] Inventor: Robert E. Gillis, P.O. Box 67, Aptos, Calif. 95003

[21] Appl. No.: 17,738

[22] Filed: Feb. 24, 1987

[51] Int. Cl.⁴ .............................................. E04B 1/343
[52] U.S. Cl. ..................... 135/109; 135/95;
    52/81; 52/DIG. 10; 446/488; 446/27
[58] Field of Search ............... 135/109, 95, 105, 106,
    135/905; 52/DIG. 10, 81; 446/488, 109, 27

[56] References Cited

U.S. PATENT DOCUMENTS

| | | | |
|---|---|---|---|
| 1,546,222 | 7/1925 | Finlay | 135/106 |
| 2,203,697 | 6/1940 | Rinkel | 52/DIG. 10 |
| 3,059,658 | 10/1962 | Finlayson | 135/109 |
| 3,267,597 | 8/1966 | Jannes | 52/DIG. 10 |
| 3,640,034 | 2/1972 | Shotwell, Jr. | 52/DIG. 10 |
| 3,766,932 | 10/1973 | Sidis et al. | 135/109 |
| 3,975,850 | 8/1976 | Giaume | 52/DIG. 10 |
| 4,026,313 | 5/1977 | Zeigler | 135/DIG. 9 |
| 4,723,382 | 2/1988 | Lalvani | 52/DIG. 10 |

FOREIGN PATENT DOCUMENTS

| | | | |
|---|---|---|---|
| 2349383 | 5/1974 | Fed. Rep. of Germany | 135/106 |
| 2339029 | 8/1977 | France | 135/106 |

OTHER PUBLICATIONS

"Locking Hubs", Popular Science, Oct. 1983, p.38.
"Oval Intention", North Face Catalog, 1976.

*Primary Examiner*—David A. Scherbel
*Assistant Examiner*—Caroline D. Dennison

[57] ABSTRACT

A foldable polyhedral structure is provided having a plurality of identical diamond-shaped polygons. A first set of diamond-shaped polygons radiates outwardly and downwardly from the top center of the structure and a second set of diamond-shaped polygons extends upwardly from ground level. The design of the polygonal faces is such that the structure folds into a flat compressed structure. A plurality of poles which extend along the edges of each diamond-shaped face will fold together with the structure. The structure may be used as a tent, a hat or as a supporting structure for solar collectors.

8 Claims, 3 Drawing Sheets

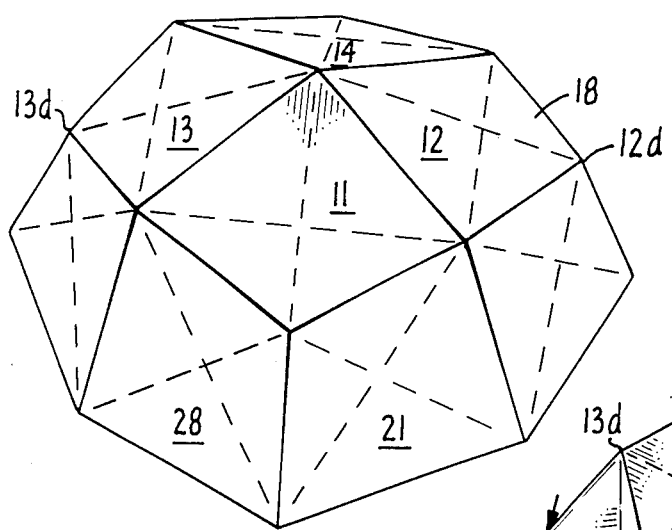
FIG.4A.
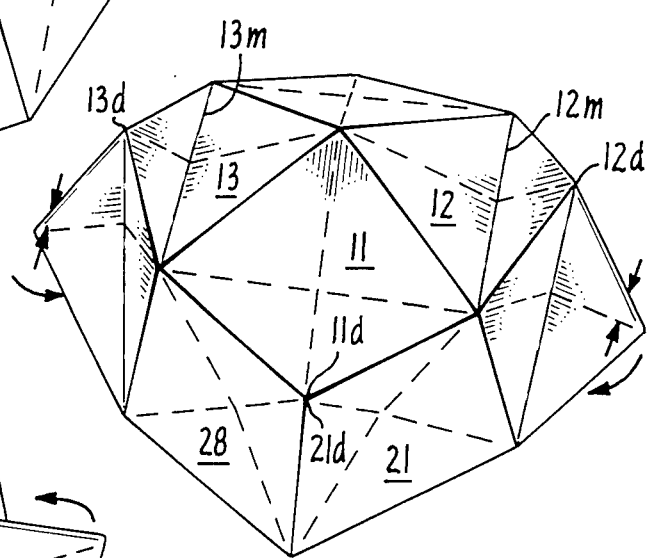
FIG.4B.
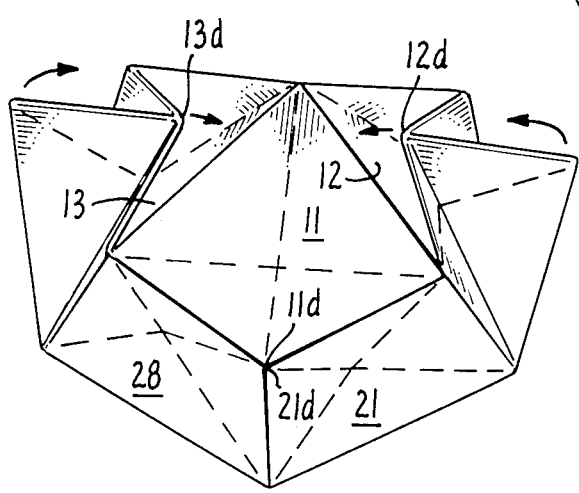
FIG.4C.
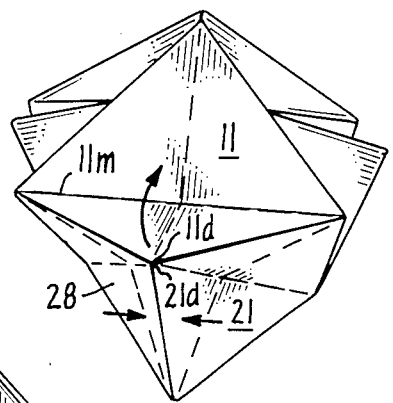
FIG.4D.
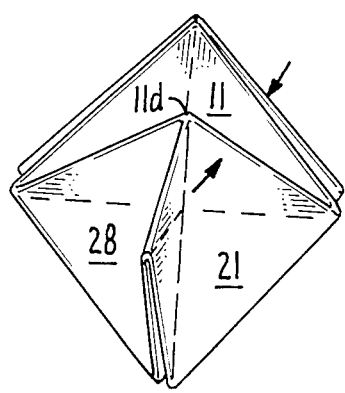
FIG.4E.
FIG.4F.

FOLDABLE POLYHEDRAL STRUCTURE

BRIEF SUMMARY OF THE INVENTION

A foldable polyhedral structure is provided by this invention. A plurality of diamond-shaped polygons is utilized in one embodiment with a plurality of poles extending along the sides of each polygon, except for those sides which lie against the ground. The structure provided by this invention is readily foldable into a very compact and flat package. It may be folded compactly either with the supporting poles or without. The structure may be used as a tent, a hat or a supporting structure for solar collectors.

The tent provided by one embodiment of this invention affords ample head room and provides side walls which are oriented nearly vertically with respect to the ground A primary object of the invention is to provide a foldable structure which in its erected position provides ample head room and which folds into a compact, flat assembly. For example, the structure provided may be of coated or waterproof cardboard to provide emergency shelter of semi-rigid material; the structure may be used for folding supports for solar collectors, and in smaller form, for hats.

A further object of the invention is to provide a tent structure which is readily assembled and which utilizes a relatively small amount of optional supporting poles relative to the usable space within the tent.

A further object of the invention is to provide a polyhedral shell that readily folds flat for transport or storage.

Other objects and advantages will become apparent from the following description of the preferred embodiments.

BRIEF DESCRIPTION OF THE DRAWINGS

FIGS. 4A-4F show how the shell or tent membrane of FIGS. 1 and 2 is folded;

DESCRIPTION OF THE DRAWINGS

Figure 1:
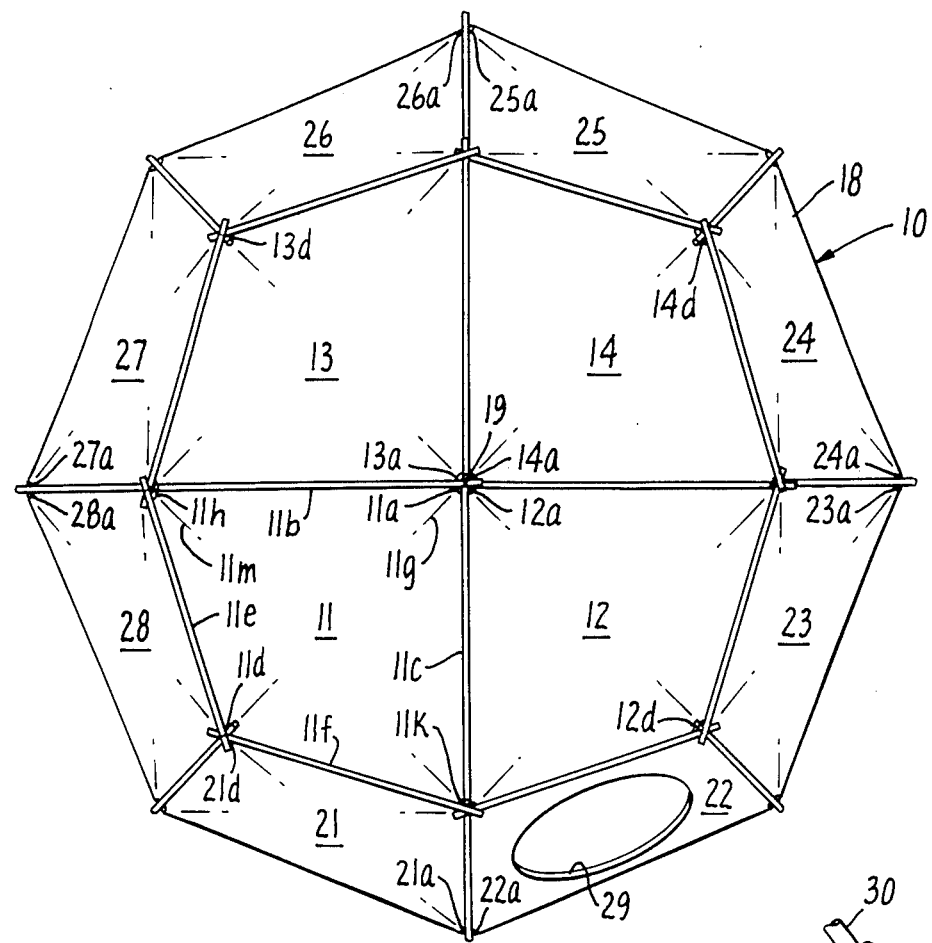
FIG. 1 is a top elevational view of a tent according to the present invention.
Figure 2:
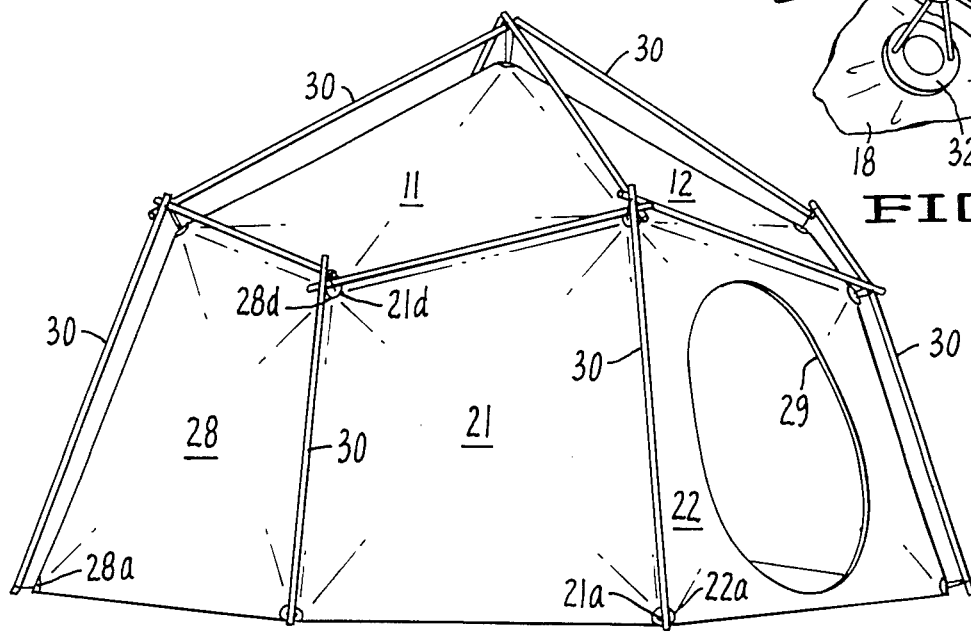
FIG. 2 is a side elevational view of the assembled tent structure shown in FIG. 1.

As shown best in FIGS. 1 and 2, a foldable polyhedral shell shown generally as 10 is provided which incorporates a plurality of diamond-shaped polygons including a first set of polygons 11, 12, 13 and 14 and a second set of diamond-shaped polygons 21-28. Polygonal face 22 has an elliptical opening 29 which is the entryway of the structure.

In the embodiment shown in FIGS. 1 and 2, each polygonal face 11-14 and 21-28 is identical (except for opening 29 in polygon 22). Polygon 11 has an acute vertex 11a formed by side 11b and side 11c. The angle formed by sides 11b and 11c is 83°. Polygon 11 also has an obtuse vertex 11d formed by side walls 11e and 11f. The obtuse angle formed by sides 11e and 11f is 115°. A major axis 11g extends from vertex 11a to vertex 11d. Vertices 11h and 11k are formed by side walls 11b and 11e and 11c and 11f, respectively. Vertices 11h and 11k are each 81°. A minor axis 11m extends between vertices 11h and 11k. In the embodiment shown in FIGS. 1 and 2, each polygon is identical to polygon 11. Polygons 11, 12, 13 and 14 each have their respective acute vertices 12a, 13a and 14a meeting at point 19 which is the top center point of the membrane 18. Polygons 11-14 radiate outwardly and downwardly from the top center point 19. Referring to FIG. 2 acute vertices 21a and 22a are adjacent each other and the obtuse vertices 21d and 28d lie adjacent each other above ground level. When the tent is fully assembled, the acute vertices 21a-28a of the second set of polygons 21-28 are all adjacent the ground.

Figure 3:
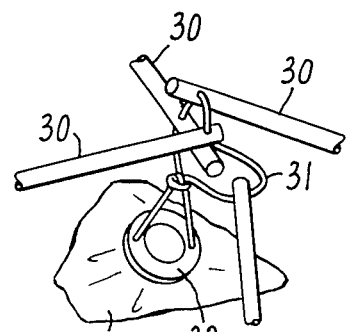
FIG. 3 is a perspective view of a portion of the tent shown in FIGS. 1 and 2.

A plurality of poles 30 is provided which extend along the sides of each polygon 11-14 and 21-28, except for the sides which abut the ground. As shown in FIG. 3, poles 30 are connected at their ends loosely by a tie strap 31 which also connects to membrane 18 by grommet means 32. Poles 30 may alternately be connected to the membrane by tubes that run along the sides of the polygons.

FIGS. 4A-4F show the tent or shell 18 without the poles 30. It is understood that the structure may be folded into a flat, compressed shape with the poles 30 in place but the folding technique is shown without poles for clarity. It is to be understood, also, that if the membrane is of a self-supporting material, such as cardboard, and if folds are made where dashed lines are shown, it will both stand on its own and fold flat; in this form, the invention can be used to provide emergency shelter. As shown in FIG. 4B, the first step of folding membrane 18 is to lift the obtuse vertices 12d and 13d, whereby the lower portion of polygonal faces 12 and 13 is folded upwardly along minor axes 12m and 13m, respectively, as shown in FIG. 4B. The phrase "lower portion" refers to that portion of face 12 below minor axis 12m and that portion of face 13 below minor axis 13m. FIG. 4C shows a continuation of the folding process wherein vertex 12d and vertex 13d are folded upwardly until the vertices 12d and 13d contact the faces of polygons 12 and 13. FIG. 4D shows the next stage of the folding process wherein the obtuse vertex 11d is folded upwardly, folding along the minor axis 11m. Similarly, obtuse vertex 14d is folded upwardly into the face of polygon 14.

As shown in FIG. 4E, the obtuse vertex 11d has been folded upwardly into contact with the face of polygon 11 and in FIG. 4F, when tent membrane or shell 18 is folded flat, polygon 21 is fully flat on top of the folded structure.

The shape of each of the polygons can be modified but the preferred angles are 83° for the acute vertex, 115° for the obtuse vertex and 81° for the remaining two vertices of each polygon.

Figure 5:
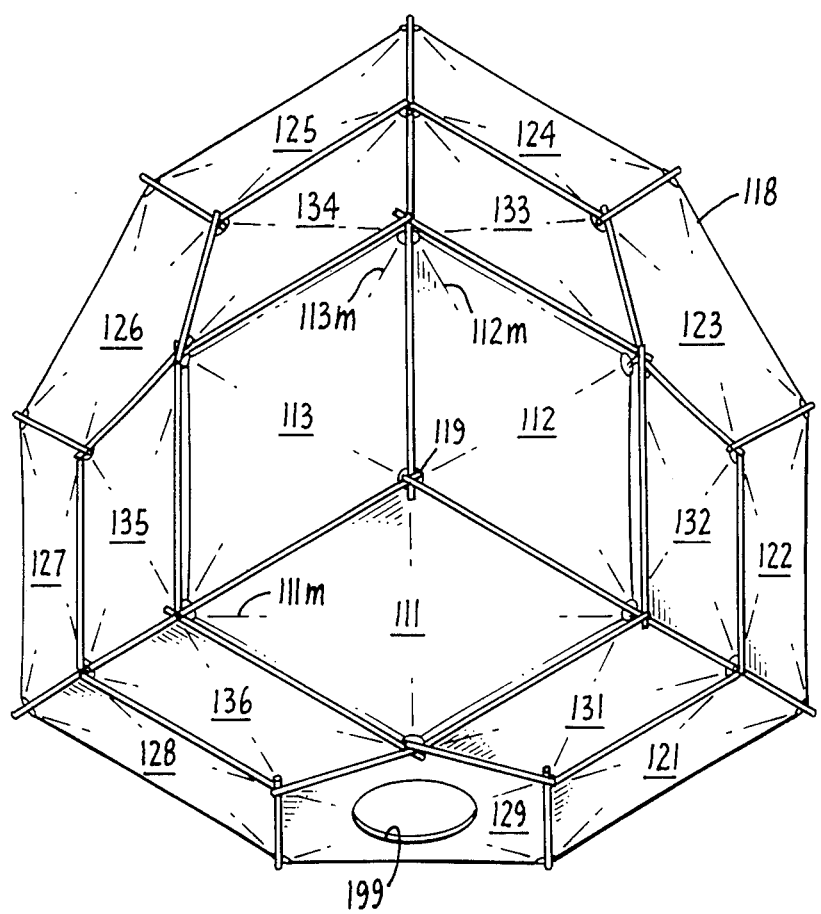
FIG. 5 is a top elevational view of an alternate embodiment of the invention.
Figure 6:
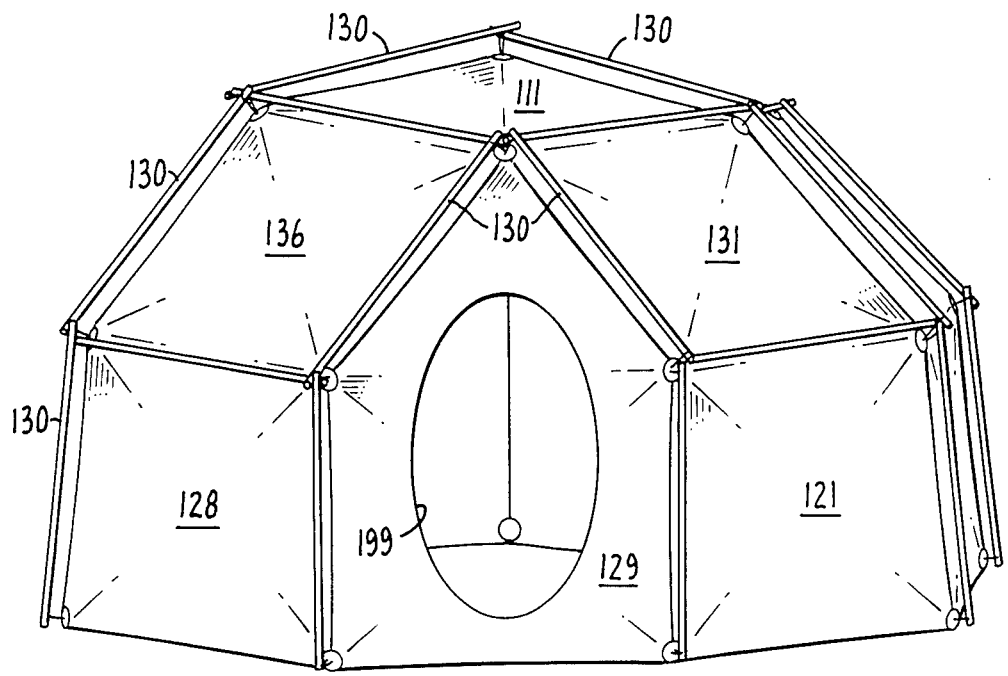
FIG. 6 is a front elevational view of the embodiment shown in FIG. 5.

FIGS. 5 and 6 show an alternate embodiment of the invention wherein the first set of polygons includes the three polygons 111, 112 and 113 rather than four polygons as shown in the embodiment in FIGS. 1-4. A second set of diamond-shaped polygons 121-129 extends around the lower periphery of membrane 118 and extend upwardly from ground level. A third set of polygons 131-136 is positioned intermediate the first and second sets of polygons. Polygons 111, 112 and 113 radiate outwardly and downwardly from center point 119. In folding the embodiment shown in FIGS. 5 and 6, the lower portions of polygons 111, 112 and 113 are folded upwardly along the minor axes 111m, 112m and 113m and the entire structure is folded flat in similar fashion to the embodiment shown in FIGS. 1-4. Access opening 199 is formed in polygon 129.

I claim:

1. A foldable polyhedral structure comprising:
   a plurality of diamond-shaped, four sided polygons,
   a first set of said plurality of diamond-shaped polygons radiating outwardly and downwardly from a point comprising the top center of said structure,
   a second set of said plurality of diamond-shaped polygons extending upwardly from ground level,
   the lower portion of each of said diamond-shaped polygons in said first set being foldable upwardly, so that the structure may fold into a flat, compressed shaped, and
   said plurality of polygons forming a continuous surface, and wherein said structure may be folded and unfolded without interrupting said continuous surface.

2. The apparatus of claim 1 wherein said polygons form a membrane and further comprising a plurality of poles extending along the sides of each polygon, except for the sides which abut the ground, and means for joining said pole ends loosely together and to said membrane at each intersection of said pole ends, so that said poles may be folded with said membrane into a flat, compressed shape.

3. The apparatus of claim 1 wherein all of said polygons are identical.

4. The apparatus of claim 3 wherein each diamond-shaped polygon has an obtuse vertex and an acute vertex.

5. The apparatus of claim 4 wherein the acute vertices of each of said first set of polygons meet at the top center of said structure.

6. The apparatus of claim 5 wherein each acute vertex of said second set of polygons is at ground level.

7. The apparatus of claim 1 wherein the structure forms a hat.

8. The apparatus of claim 1 wherein the structure is made of cardboard and forms emergency shelter.

* * * * *